(12) United States Patent
Nomura et al.

(10) Patent No.: US 7,679,238 B2
(45) Date of Patent: Mar. 16, 2010

(54) DRIVING APPARATUS FOR HYBRID VEHICLE

(75) Inventors: Shinichi Nomura, Anjo (JP); Yasuo Yamaguchi, Anjo (JP); Takeshi Inuzuka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 642 days.

(21) Appl. No.: 10/590,974

(22) PCT Filed: Apr. 27, 2005

(86) PCT No.: PCT/JP2005/008031

§ 371 (c)(1),
(2), (4) Date: Oct. 20, 2006

(87) PCT Pub. No.: WO2005/105507

PCT Pub. Date: Nov. 10, 2005

(65) Prior Publication Data

US 2007/0108857 A1     May 17, 2007

(30) Foreign Application Priority Data

Apr. 28, 2004 (JP) ............................. 2004-134760

(51) Int. Cl.
*H02K 7/10* (2006.01)
(52) U.S. Cl. ........................................ 310/78; 310/100
(58) Field of Classification Search ............... 310/68 B, 310/78, 75 R, 76, 92, 100
See application file for complete search history.

(56) References Cited

U.S. PATENT DOCUMENTS

| | | | | |
|---|---|---|---|---|
| 5,584,776 A | * | 12/1996 | Weilant et al. | 475/213 |
| 5,649,459 A | * | 7/1997 | Murakami et al. | 74/665 GE |
| 5,954,150 A | * | 9/1999 | Miller et al. | 180/248 |
| 6,062,330 A | * | 5/2000 | Watson et al. | 180/248 |
| 6,258,001 B1 | * | 7/2001 | Wakuta et al. | 475/5 |
| 6,263,995 B1 | * | 7/2001 | Watson et al. | 180/248 |

(Continued)

FOREIGN PATENT DOCUMENTS

DE     100 18 926 A1     11/2000

(Continued)

OTHER PUBLICATIONS

Supplementary European Search Report in EP 05 73 7222 completed on Oct. 27, 2009.

*Primary Examiner*—Thanh-Tam T Le
(74) *Attorney, Agent, or Firm*—Oliff & Berridge, PLC

(57) ABSTRACT

A driving apparatus includes a transmission mechanism portion; a motor housed in a motor housing located at an engine side of the transmission mechanism portion; and a clutch interposed between an engine output shaft and an input shaft of the transmission mechanism portion, wherein: a secondary side of the clutch, which is connected to the input shaft, is configured by a cover; a rotor of the motor is integrally connected to the cover, which is the secondary side of the clutch; a stator of the motor is fixed to the motor housing; a front hub positioned at the engine side of the cover is rotatably supported at a front wall member of the motor housing; and a rear hub positioned at the transmission mechanism portion side of the cover is rotatably supported at a rear wall member of the motor housing.

15 Claims, 5 Drawing Sheets

U.S. PATENT DOCUMENTS

| | | |
|---|---|---|
| 6,354,974 B1 | 3/2002 | Kozarekar |
| 6,405,702 B2 * | 6/2002 | Takano et al. ............. 123/192.2 |
| 6,478,101 B1 * | 11/2002 | Taniguchi et al. ........ 180/65.22 |
| 6,585,066 B1 | 7/2003 | Koneda et al. |
| 6,628,021 B2 * | 9/2003 | Shinohara et al. ......... 310/68 B |
| 6,634,980 B1 | 10/2003 | Ziemer |
| 6,935,450 B1 * | 8/2005 | Tsuzuki et al. ........... 180/65.26 |
| 7,017,693 B2 * | 3/2006 | Omote et al. ............ 180/65.26 |
| 2002/0066607 A1 | 6/2002 | Levin |
| 2004/0045752 A1 | 3/2004 | Omote et al. |

FOREIGN PATENT DOCUMENTS

| | | |
|---|---|---|
| DE | 100 62 596 A1 | 6/2001 |
| DE | 10140 366 A1 | 7/2003 |
| EP | 1 150 007 A2 | 10/2001 |
| JP | A-10-014171 | 1/1998 |
| JP | A-2001-241470 | 9/2001 |
| JP | A-2003-063261 | 3/2003 |
| JP | A-2003-205756 | 7/2003 |
| JP | A-2004-001708 | 1/2004 |

* cited by examiner

DRIVING APPARATUS FOR HYBRID VEHICLE

This application is the U.S. National Stage of PCT/JP2005/08031, filed Apr. 27, 2005, which claims priority from JP2004-134760, filed Apr. 28, 2004, the disclosures of which are incorporated herein in their entireties by reference thereto.

BACKGROUND

The present invention relates to a driving apparatus for a hybrid vehicle.

There exists several kinds of driving apparatuses for hybrid vehicles in which a conventional automatic transmission is utilized, and in which a motor and a clutch are located at a torque converter portion. In such a driving apparatus, as described in Japanese Patent Application No. JP-A-2004-1708 for example, a clutch (starting clutch) is interposed between an engine output shaft and an input portion of an automatic transmission apparatus, and a rotor of a motor is integrally fixed to an engine output side (primary side) of the clutch. In other words, the primary side of the clutch has a shell (drum) structure as well as a torque converter, the clutch is accommodated in the shell structure, and the rotor of the motor is integrally fixed to a front cover portion, which configures the shell structure.

Accordingly, in a conventional torque converter, a front of the front cover is fitted to the engine output shaft as a center piece, a rear case is rotatable relative to an oil pump body, and the shell has an oil-tight configuration. This driving apparatus is thus configured as a doubly supported structure to some extent.

However, in the apparatus, in which the rotor of the motor is connected to the primary side of the clutch, the engine output shaft and the motor rotor are connected. Accordingly, at the time of starting by the motor, the engine needs to rotate idly. Therefore, a loss of power occurs. Further, when the motor is utilized as a generator for regeneration, regeneration is difficult until the vehicle stops because of interference by an engine rotational frequency. Further, though the shell structure portion (front cover), to which the rotor of the motor is fixed, becomes the doubly supported configuration to some extent, the front thereof is supported at the engine output shaft by the centerpiece. It is thus difficult to support a shaft center of the front cover with high precision because of influences from vibrations of the engine, or the like. Accordingly, an air gap between the rotor fixed to the front cover and a stator fixed to a housing becomes large, and it is therefore impossible to sufficiently exert performance of the motor.

In the light of the foregoing, for example, as described in U.S. Pat. No. 6,585,066, an apparatus is suggested in which a rotor of a motor is connected to a secondary side (automatic transmission apparatus side) of the clutch. In this apparatus, a hub side of the clutch is a primary side connected to an engine output shaft, and a secondary side includes a flange member having a flange. A front of the flange member is opened, and is penetrated with a connecting member (a damper spring, a flexible plate, or the like) that connects the clutch primary side including the hub with the engine output shaft.

In this apparatus, when a vehicle starts, a torque of the motor can be transmitted directly to an automatic transmission apparatus without being interfered by the engine by turning off the clutch. When the motor is utilized as a generator for regeneration, kinetic energy can be regenerated as electric energy until the vehicle stops.

SUMMARY

However, in this apparatus in which the motor rotor is connected to the secondary side of the clutch, both the hub, which serves as the primary side, and the flange member, which serves as the secondary side and has the flange, are configured to be cantilevered configurations. Accordingly, it is difficult to coaxially support the hub and the flange member with high precision. In particular, the flange member having the flange (secondary side), to which the rotor is fixed, is not capable of making a gap (air gap) between the rotor and a stator sufficiently small because of insufficient precision. This insufficient precision also has a large influence on a performance of the motor.

Further, the entire housing is immersed in oil and is in a wet state because the front of the flange member, which serves as the secondary side and has the flange, is opened. Accordingly, the amount of the oil for cooling the clutch needs to be large. The rotor also agitates a large amount of oil, which leads to energy loss. Furthermore, it is difficult balancing the larger amount of oil.

According to a first exemplary aspect of the present invention, a driving apparatus includes a transmission mechanism portion; a motor housed in a motor housing located at an engine side of the transmission mechanism portion; and a clutch interposed between an engine output shaft and an input shaft of the transmission mechanism portion, wherein: a secondary side of the clutch, which is connected to the input shaft, is configured by a cover; the cover houses friction plates of the clutch, an actuator, and a primary side member connected to the engine output shaft; a rotor of the motor is integrally connected to the cover, which is the secondary side of the clutch; a stator of the motor is fixed to the motor housing; a front hub positioned at the engine side of the cover is rotatably supported at a front wall member of the motor housing; and a rear hub positioned at the transmission mechanism portion side of the cover is rotatably supported at a rear wall member of the motor housing.

According to a second exemplary aspect of the present invention, a driving apparatus includes a transmission; a motor housed in a motor housing; a clutch interposed between an engine output shaft and an input shaft of the transmission; a cover that houses friction plates of the clutch, an actuator, and a primary side member connected to the engine output shaft; a front hub that is (1) connected between the engine output shaft and the clutch and (2) supported at a front wall member of the motor housing; and a rear hub that is (1) connected between the transmission and the clutch and (2) rotatably supported at a rear wall member of the motor housing.

According to a third exemplary aspect of the present invention, a driving apparatus includes a transmission; a motor housed in a motor housing located at an engine side of the transmission; a clutch interposed between an engine output shaft and an input shaft of the transmission; and a cover that is connected to the input shaft and houses friction plates of the clutch, an actuator, and a primary side member connected to the engine output shaft, wherein: a rotor of the motor is integrally connected to the cover; a stator of the motor is fixed to the motor housing; the cover is rotatably supported at a front wall member and a rear wall member of the motor housing.

BRIEF DESCRIPTION OF THE DRAWINGS

Various embodiments of the invention will be described with reference to the drawings, wherein.

DETAILED DESCRIPTION OF EMBODIMENTS

Figure 1:
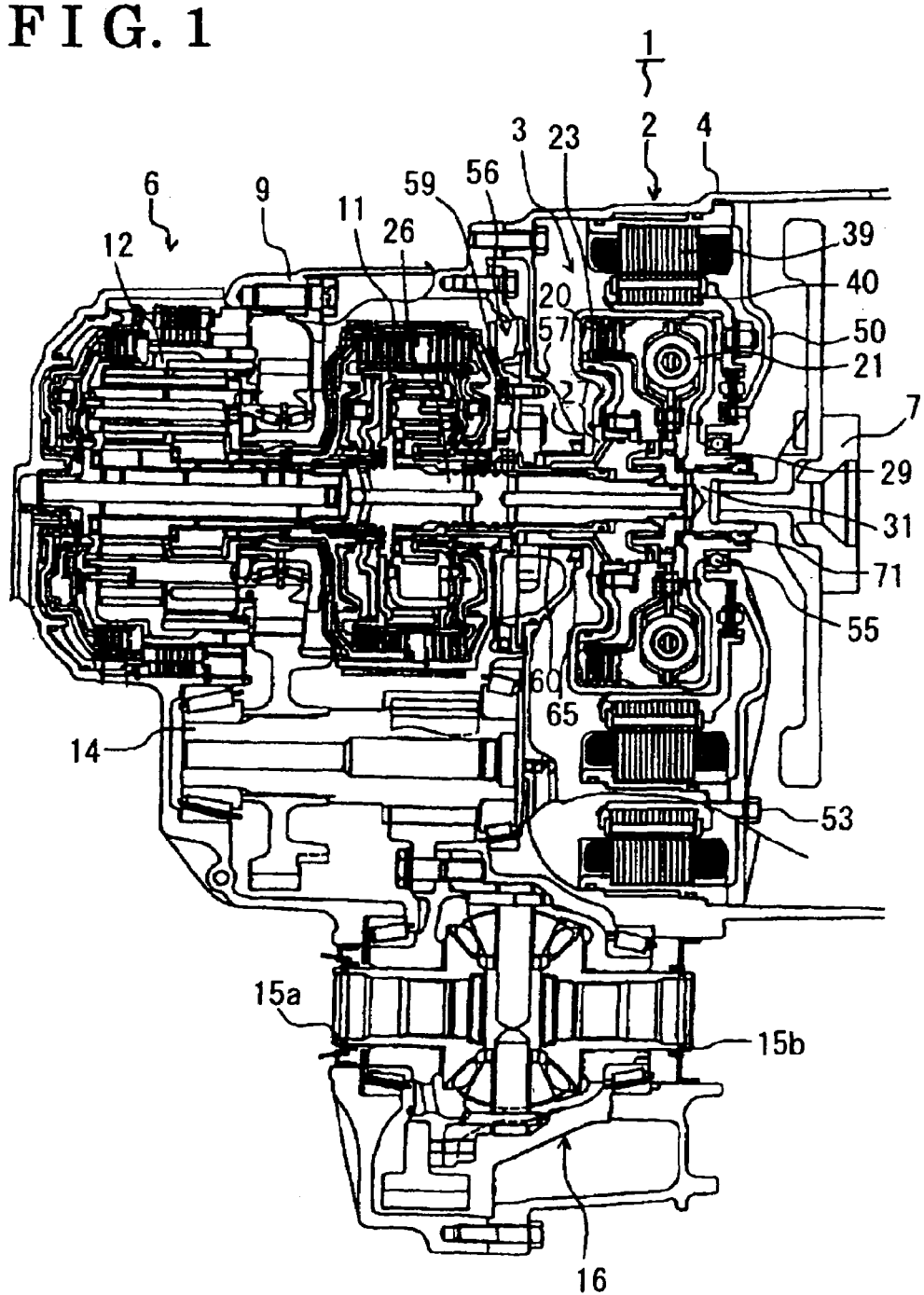
FIG. 1 is an overall cross-sectional view illustrating a driving apparatus for a hybrid vehicle according to an embodiment of the present invention.
Figure 2:
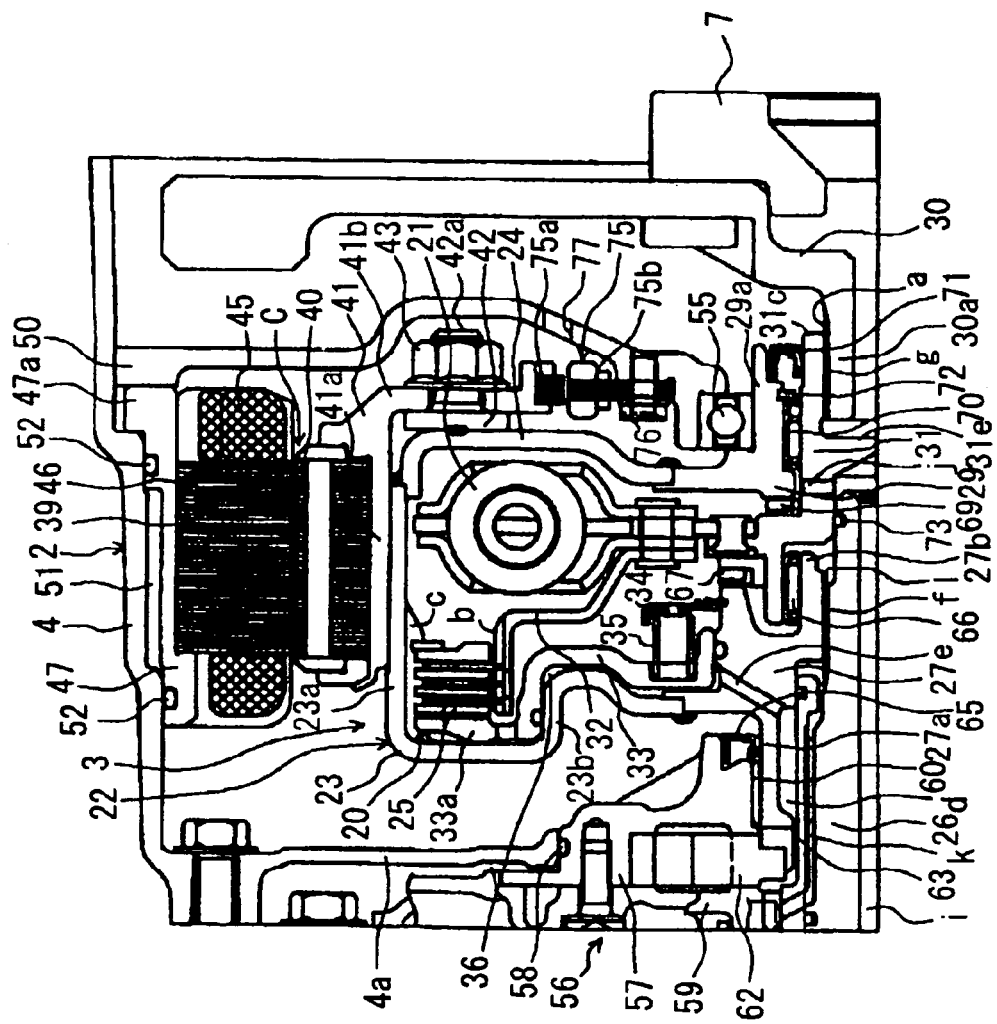
FIG. 2 is an enlarged cross-sectional view illustrating a portion thereof.

In the following, an embodiment of the present invention will be explained with reference to the drawing figures. FIG. 1 represents a cross-sectional view illustrating an example of a configuration of a driving apparatus for a hybrid vehicle according to the present invention. FIG. 2 represents a figure illustrating a portion of the driving apparatus for the hybrid vehicle. In the driving apparatus 1 for the hybrid vehicle illustrated in FIGS. 1 and 2, a motor 2 and a clutch apparatus (hereinafter, referred to as a starting apparatus 3) are added to a torque converter portion of a conventional automatic transmission (A/T). The driving apparatus 1 for the hybrid vehicle includes an internal combustion engine only engine output shaft 7 is illustrated) such as a gasoline engine or the like, the motor/generator (hereinafter, simply referred to as a motor 2) including a brushless DC motor, or the like, accommodated in a motor housing 4, the starting apparatus 3 accommodated in the motor housing 4, and a multistage transmission mechanism portion 6 of the automatic transmission to which a driving force is transmitted from the engine and the motor 2. In other words, in the driving apparatus 1 for the hybrid vehicle according to the present invention, the motor 2 and the starting apparatus 3, and the multistage transmission mechanism portion 6 of the automatic transmission are arranged sequentially from the engine side.

The multistage transmission mechanism portion 6 described above is accommodated in a transmission case 9. The multistage transmission mechanism portion 6 is a FF (front engine, front drive) type which includes two transmission mechanism portions 11 and 12 arranged coaxially with an input shaft 26, a counter shaft 14 arranged in parallel with the input shaft 26, and a differential apparatus 16 for distributing and transmitting a power to front wheel drive axles 15a, 15b. The two transmission mechanism portions 11, 12, counter shaft 14 and differential apparatus 16 are accommodated in an integral case that can be separated. The motor housing 4 is fixed to the transmission case 9 of the multistage transmission mechanism portion 6. The motor housing 4 and the transmission case 9 are accommodated in a space for the automatic transmission.

The starting apparatus 3 includes a clutch 20 and a damper spring 21. The entire starting apparatus 3 is located in a cover 22 of a shell structure. The cover 22 includes a body (rear) cover 23 of which an outer diameter side extends like a drum shape, and a front cover 24, which is a lid shape for closing a front of a drum portion 23a. Both covers are integrally secured together by means of welding. A rear hub 27, connected to the input shaft 26 of the multistage transmission mechanism portion 6 and serving as an output side (secondary side) of the clutch 20, is integrally secured to an inner peripheral side of the rear cover 23 by means of welding. A ring-shaped front hub 29 is integrally secured to an inner peripheral side of the front cover 24 by means of welding.

A connecting member 30, of which a tip end is protruded, is integrally fixed to the engine output shaft 7. A spline a is formed at an outer periphery of the protruding portion 30a. On the other hand, a center member 31, serving as an input side (primary side member) of the clutch 20, is connected by the spline a to the connecting member 30. An input side of the damper spring 21 is integrally fixed to the center member 31. A hub member 32 of the clutch 20 is fixed to an output side of the damper spring 21. Friction plates 25, respectively including a clutch plate and a clutch disc, are provided between a spline b formed at an outer peripheral surface of the hub member 32 and a spline c formed at an inner peripheral surface of the drum portion 23a of the rear cover 23. In the friction plate, the clutch plate and the clutch disc are alternately and respectively engaged with the spline b or c, by which the clutch 20 configured with a wet type multi-plate clutch is configured.

A rear surface side of the rear cover 23 includes a portion 23b bending and extending in an axial direction. A piston 33 is fitted in an oil-tight manner with the portion 23b and the outer peripheral surface of the rear hub 27 as sliding surfaces. The piston 33 extends outwardly radially and serves as an operational arm 33a for pressing the friction plates 25. Further, a return spring 35 is contracted and provided between a back surface of the piston 33 and a collar 34 fixed to the rear hub 27 so that the collar 34 does not come off. Thus, a hydraulic actuator 36 for the clutch 20 is configured.

On the other hand, the motor 2 includes a stator 39 and a rotor 40. The rotor 40 includes many layered plates, in which a permanent magnet (member) is embedded, and a supporting plate member 41 for fixing and supporting the layered plates. The supporting plate 41 includes a supporting portion 41a of a cylindrical shape for supporting the layered plates and a ring-shaped plate portion 41b provided downward from one end side of the supporting portion. Further, a fixing plate 42, to which bolts 42a are planted at a predetermined angular interval, is integrally secured to a front side surface of the front cover 24 by means of welding. The supporting plate 41 is integrally secured to the front cover 24 by laying the plate portion 41b over the fixing plate 42 and by screwing nuts 43 to the bolts 42a. At this time, the supporting portion 41a of the supporting plate is integrally fitted to the drum portion 23a of the rear cover 23 such that the rotor 40 and the cover 22 are positioned with precision and are integrated together.

The stator 39 includes iron-cores 46 around which coils 45 are wound. The iron-cores 46 are fitted to a sleeve 47 and integrally fixed by a synthetic resin. Further, the sleeve 47 is fitted to the motor housing 4, and the stator 39 is positioned with accuracy and fixed to the motor housing 4 by interposing and fixing a collar portion 47a between the motor housing 4 and the separation wall member 50. At this time, an air gap 51 is formed between the sleeve 47 and the motor housing 4. The air gap 51 is configured in a liquid-tight manner by O-rings 52, 52 provided at the sleeve 47. Thus, a water jacket for cooling the stator 39 is configured. In the meantime, the stator 39 is set as large as possible within a range that the minimum ground clearance of the vehicle is not lowered, and a predetermined output thereof is assured aiming at multipolarity. Further, it is desirable that, the layered plates of the rotor 40 have a strength of such a degree that the layered plates can sufficiently tolerate a centrifugal force, and that the layered plates of the rotor 40 can be positioned to face the stator 39 across an air gap C, which is as small as possible within a range that the layered plates of the rotor 40 do not interfere with the stator 39.

The separation wall member 50, configuring the front wall member of the motor housing, is fitted to the cylindrical motor housing 4 and is fixed by a bolt 53 (refer to FIG. 1). A ball bearing 55, serving as a rotation-supporting member, is provided at a center hole portion (inner diameter portion) of the separation wall member 50. A cylindrical portion 29a of the front hub 29 is freely rotatably supported by the bearing 55. On the other hand, an oil pump assembly 56 is fixed at a coupled portion between the motor housing 4 and the transmission case 9. The pump assembly 56 includes a pump body 57 and a pump cover 59 integrally fixed together. The pump body 57 is fitted to a rear wall 4a of the motor housing 4 with an O-ring 58 there between and is positioned, while the pump body 57 configures a separation wall (rear wall member) that separates the motor housing 4 and the multistage transmission mechanism portion 6 inside the transmission case 9.

Then, a cylindrical portion 27a of the rear hub 27 is freely rotatably supported at a center hole of the pump body 57 through a bush 60, which serves as a rotation-supporting member. Accordingly, the front hub 29, provided at a front of the cover 22 of a shell structure, is freely rotatably supported at the separation wall member 50 via the bearing 55, and the rear hub 27, provided at a rear of the cover 22, is freely rotatably supported at the pump body 57 via the bush 60. In other words, the cover 22, which serves as the secondary side of the clutch 20, is positioned with accuracy and supported by the motor housing 4 by a doubly supported structure and the cover 22 is integrally fixed with the rotor 40. Further, an end of the cylindrical portion 27a of the rear hub 27 is connected to a rotary pump body 62 of the pump assembly 56. Further, a sleeve shaft 63, fixed to the pump cover 59, is located between the input shaft 26 and the hub cylindrical portion 27a. Further, an oil seal 65 is located between the pump body 57 and the hub cylindrical portion 27a outside the bush 60 (hub side). An oil passage d is formed between the hub cylindrical portion 27a and the sleeve shaft 63 with an O-ring attached at an end portion thereof. The oil passage d communicates with an oil chamber of the hydraulic actuator 36 for the clutch through an oil passage e formed at the rear hub 27. The rear hub 27 has a ring-shaped recessed structure at a front side thereof. A spline f is formed at an inner peripheral surface of a protruding portion 27b of a cylindrical shape. The spline f engages with the input shaft 26. An outer peripheral surface of the protruding portion 27b serves as a supporting surface for a needle bearing 66, which supports the center member 31. Further, a thrust washer 67 is located between a rear side surface of the center member 31 and the rear hub 27, while a thrust bearing 69 is located between a front side surface of the center member 31 and the front hub 29, wherein a position of the center member 31 is determined in an axial direction.

A front side of the center member 31 protrudes cylindrically. An inner spline g is formed at an inner peripheral surface of this protruding portion 31c and engages with the spline a of the connecting member 30. An outer peripheral surface of the protruding portion 31c serves as a supporting surface for a needle bearing (rotation-supporting portion) 70 and an oil seal 71. The needle bearing 70 is provided at an inner peripheral surface of the boss cylindrical portion 29a by a snap ring 72. The oil seal 71 is provided at an end side of the bearing 70 between the boss cylindrical portion 29a and the center member 31. An oil passage i is formed at a center portion of the input shaft 26 in an axial direction. A seal ring 73 is provided at an end portion of the input shaft 26. Further, the center member 31 is separated from a front side portion by an inner solid portion 31e. An oil passage j is formed at the center member 31. Thus, a lubrication oil passage is formed for supplying lubrication oil to the needle bearing 70, to the thrust washer 69, and further to the friction plates 25 of the clutch 20, or the like.

The cover 22 of a shell structure is configured to be oil-tight by the oil seal 65 between the pump body 57 and the rear hub 27, and by the oil seal 71 between the front hub 29 and the center member 31. Accordingly, the lubrication oil can sufficiently be supplied into the cover 22. On the other hand, the inside of the motor housing 4 outside the cover 22 can be retained at a dry state. Accordingly, the motor 2 located in the motor housing 4, which is outside of the cover 22, can be maintained at the dry state. Therefore loss caused by agitation of oil by the rotor 40, or the like, does not take place. Further, as described above, the front hub 29 and the rear hub 27, configuring the cover 22, are accurately supported by the motor housing 4. Accordingly, the center member 31, supported by the bearings 70 and 66, is supported by these hubs with high precision.

According to the structure of the front hub 29, the rear hub 27, and the center member 31 described above, for example, the cover 22 is in a shell structure. High precision support can be achieved by using a double support and an oil-tight structure is achieved by using the inner peripheral surfaces and the outer peripheral surfaces (66, 67, g, 70, 71, 69) or the like. Further, the starting apparatus 3 can be compactly configured, in particular, compactly in an axial direction. Further, by laying the motor 2 over the starting apparatus 3 in the axial direction, it can be housed within a dimension of a conventional automatic transmission.

Further, many inner teeth are formed at an inner peripheral portion of the plate portion 41b of the rotor supporting plate 41, and a rotor plate 75a is fixed thereat. A stator 75b, having outer teeth, is fixed inside the separation wall portion 50 by a bolt 76. The inner teeth and the outer teeth face each other. Thus, a resolver 75, which is a sensor for detecting a rotational angle (phase) of the rotor 40, is configured. The resolver 75 is also located in the dry space in the motor housing 4 outside the cover, as well as the motor 2. Because the resolver 75 is located in the dry space in the motor housing 4, a hole 77 can be appropriately formed at the separation wall member 50. By virtue of the hole 77, adjustment of the resolver 75 can be easy.

Next, an operation of the driving apparatus for the hybrid vehicle will be explained. In a state where a vehicle stands still, the hydraulic actuator 36 is released and the clutch 20 is in a disconnected state. Further, even when a key switch is in an ON state, current does not flow in an ignition, and an engine is in a standing-still state.

Then, when a driver steps on an accelerator pedal and a start signal is output, current flows into the motor 2 from a battery (not illustrated). Then, the motor 2 functions as a motor. In other words, when a controller (not illustrated) applies current flow to the coil 45 of the stator 39 at an appropriate timing on the basis of a signal (position of the rotor 40) from the rotational position-detecting sensor 75, the rotor 40 rotates in a forward direction at high efficiency. This rotational driving force is transmitted to the front cover 24 through the rotor supporting plate 41 and the bolts 42a. Rotation of the front cover 24 is transmitted to the rear cover 23, which transmits the rotation to the input shaft 26 through the rear hub 27, and the rotation is transmitted to the multistage transmission mechanism portion 6 and a driving wheel. Here, the motor 2 has a driving characteristic that the motor 2 outputs higher torque at the time of low rotational frequency. In cooperation with high torque ratio of the first shift stage of the multistage transmission mechanism portion 6, the wheel starts moving smoothly and with a predetermined torque.

At this time, the cover 22 is supported (55, 60) at the motor housing 4 with high precision by the doubly supported configuration, therefore the rotor 40 integral with the cover 22 is also supported with high precision. Also, because the stator 39 is directly supported by the motor housing 4, the air gap between the stator 39 and the rotor 40 can be controlled with high precision, and a high output can be obtained on the basis of high efficiency. Further, when the clutch 20 is at the disconnected state, even when the cover 22 rotates, the rotation of the cover 22 is not transmitted to the engine output shaft 7. Accordingly, the engine stands still without idly rotating, and a loss of power caused by idle rotation does not take place. Further, because the motor 2 is located in the dry space, the rotor 40 does not agitate oil. Even though the motor 2 is located in the dry space, because cooling water flows in the air gap 51, the stator 39 can be cooled sufficiently and high efficiency can be maintained.

Then, when a vehicle speed reaches a predetermined speed, or, even at a comparably low speed, when a throttle is opened at a degree equal to or larger than a predetermined degree of opening by a driver who steps on the acceleration pedal in order to accelerate or travel uphill, oil pressure is supplied to the hydraulic actuator 36 through the oil passages d and e, the piston 33 is moved, the operational arm 33a presses the friction plates 25, and the clutch 20, including the wet type multiplate clutch, is smoothly connected. Because the clutch 20 is connected, the rotation of the cover 22 is transmitted to the engine output shaft 7 through the damper spring 21 and the center member 31. In cooperation with igniting an ignition plug and supplying fuel, the engine starts moving. In other words, the motor 2, which functions as a starter, starts the engine.

The rotation of the engine is transmitted to the cover 23 through the output shaft 7, the connecting member 30, the center member 31, the damper spring 21, and the clutch 20, and is transmitted to the input shaft 63 together with the driving force of the motor 2.

Then, the vehicle runs by the large driving force because both the driving force of the internal combustion engine and the driving force of the motor 2, which functions as a motor, are summed. At this time, the multistage transmission mechanism 6 of the automatic transmission is upshifted, and rotation of a desirable rotational speed can be transmitted to the driving wheel.

At this time, the lubrication oil is supplied into the cover 22 through the oil passages i and j, and the lubrication oil is discharged through oil passages l and k. Accordingly, the bearings 66, 70, 67, 69 and the clutch friction plates 25, or the like, can operate in circumstances where the lubrication oil is sufficiently present. The lubrication oil does not leak from the cover 22 of a shell structure by virtue of the oil seals 65 and 71. Accordingly, the inside of the motor housing 4, outside the cover 22, can remain dry.

Further, when the vehicle is in a steady state of running at a high speed, the motor 2 is operated to move without a load (motor output is controlled so as to cancel a torque generated by counter electromotive force generated at the motor), and the motor 2 idly rotates. Accordingly, the vehicle runs only by the driving force of the internal combustion engine. In the meantime, when the amount of charged electricity in the battery (SOC, state of charge) is small, the motor 2 functions as a generator to regenerate energy. Further, when the output from the internal combustion engine has a margin, for example, at the time of steady low/middle speed running, or at the time of traveling downhill, or the like, the motor 2 functions as a generator according to the SOC of the battery to charge the battery.

When the vehicle stops according to a traffic signal, or the like, at first the clutch 20 is disconnected to disconnect a relation of transmission between the center member 31 and the cover 23. In this state, the ignition plug and supply of fuel are stopped to stop the internal combustion engine. Then, the motor 2 functions as a generator to regenerate electric energy from energy of inertia of the vehicle. By doing so, a regenerative brake can be set by the motor 2 without receiving influence from the rotation of the internal combustion engine. In the meantime, timings for this can be adjusted according to a state of running and characteristic of the vehicle. The timing of the regenerative brake can be synchronized with that of a mechanical brake. Further, an engine brake can also be applied.

In other words, there is no idling state, which is inevitable in a conventional engine. Further, when the vehicle starts moving in the standstill state, as described above, at first, the vehicle starts moving by the motor driving force of the motor 2. Then, in a comparably low-speed state immediately after that, the motor driving force starts the engine. Because a sudden change of the driving force of the engine can be canceled by an assistance of the driving force of the motor 2, the vehicle can run smoothly. Then, at the time when an engine brake is necessary, and at the time of braking, the motor 2 serves as a regenerative brake to regenerate electric energy from energy of inertia of the vehicle. Further, the vehicle runs with use of the motor in a region where efficiency of the engine is low, for example, at the time when a load applied to the engine is low, or, at the time when a load applied to the engine is extremely low. From combinations of these, the hybrid vehicle can decrease fuel consumption and exhaust gas.

In particular, according to the present invention, the rotor 40 can be supported at the motor housing 4 with high precision because of the doubly supported configuration. Accordingly, in cooperation with the stator 39 fixed to the motor housing 4, the air gap between the rotor 40 and the stator 39 can be controlled with high precision. Accordingly, the motor 2 can be retained so as to have high efficiency. Further, because the motor 2 and the resolver 75, which serve as a rotational sensor, are provided in the dry circumstances, agitation loss of oil can be decreased.

Then, because the rotor 40 is connected to the cover 22, which serves as the secondary side of the clutch 20, the engine can be disconnected from a driving system by disconnecting the clutch 20. Accordingly, at the time of starting the vehicle, or the like, when the vehicle is driven only by the motor output, there is no need to idly rotate the engine. Therefore, loss according to the idle rotation of the engine can be eliminated. Further, the clutch 20 can be connected in the optimum state to start the engine. Further, because the clutch 20 is disconnected, the motor 2 can be controlled without being interfered with by the internal combustion engine. In particular, at the time of braking the vehicle, or the like, sufficient regenerative energy can be ensured. From combinations of these, efficiency of the driving apparatus 1 for the hybrid vehicle can be increased, and a hybrid driving apparatus of high performance can be obtained.

In the meantime, in the embodiment described above, an example, in which the present invention was applied to the automatic transmission 6 of a FF type, was explained. Of course, there is no need to limit to this. The present invention can also be applied to an automatic transmission of a FR type and an automatic transmission of a CVT type.

Next, a partially changed embodiment will be explained with reference to FIG. 3. In the meantime, in the embodiment, a power transmission portion from the engine output shaft 7 to the starting apparatus 3 is changed from the previous embodiment. Specifically, a damper spring is provided outside the cover. However, other points are substantially the same as those in the previous embodiment. Accordingly, identical reference numbers will be applied and explanations thereof will be skipped.

In a present driving apparatus $1_1$ for the hybrid vehicle, the engine output shaft 7 and a connecting member 30, of the center member 31 are different from those in the previous embodiment. The driving apparatus $1_1$ includes a drive plate (flywheel) 81 and a flexible plate 82. The drive plate 81 is secured to the engine output shaft 7 by a bolt 83. The drive plate 81 and an end portion of the flexible plate 82 are fixed together by a bolt 85 through a collar 84.

On the other hand, a damper apparatus (damper spring) $21_1$, in which plural coil springs 86 are located in a circumferential direction, is located between an inner diameter side of the flexible plate 82 and the center member 31. The damper spring 21, includes two drive plates 87 and a driven plate 89, which is positioned there between. The coil spring 86 is interposed therein in a direction to which a torque is applied (axial direction of the coil spring). The driven plate 89 is fixed to a boss portion 90. A base portion of the drive plate 87 is freely rotatably supported by the boss portion 90. The flexible plate 82 is fixed to an end portion of the drive plate 87. The protruding cylindrical portion of the center member 31 engages with an inner diameter hole of the boss portion 90 through splines a and g.

In other words, in the previous embodiment, the damper spring 21 is located in the cover 22, however, in the present embodiment, the damper spring 21, is located at the engine side of the separation wall member 50, and connected to the engine output shaft 7 through the flexible plate 82. Accordingly, a length of the connecting portion with the engine is longer in the present embodiment by this. On the contrary, the previous embodiment is compactly configured in an axial direction.

Because only the clutch 20 is accommodated in the cover 22, the cover 22 of a shell structure, including the rear cover 23, the front cover 24, the rear hub 27, and the front hub 29, is configured more compact than the previous embodiment in an axial direction by this. Further, by this, the rotor supporting plate 41 is fixed by screwing a thick nut member $42_1$, which serves as a fixing plate for fixing the rotor 40 to the cover 22, to a bolt 92.

Others are the same as the previous embodiment. The rear hub 27 is supported at the pump body 57 by the bush 60, the front hub 29 is supported at the separation wall member 50 by the bearing 55, and the inside of the cover 22 is configured to be oil-tight by the oil seals 65 and 71.

Further, an operation is the same as those in the previous embodiment, excepting that the damper spring $21_1$ is positioned outside the cover 23 and is in the dry circumstances.

Figure 4:
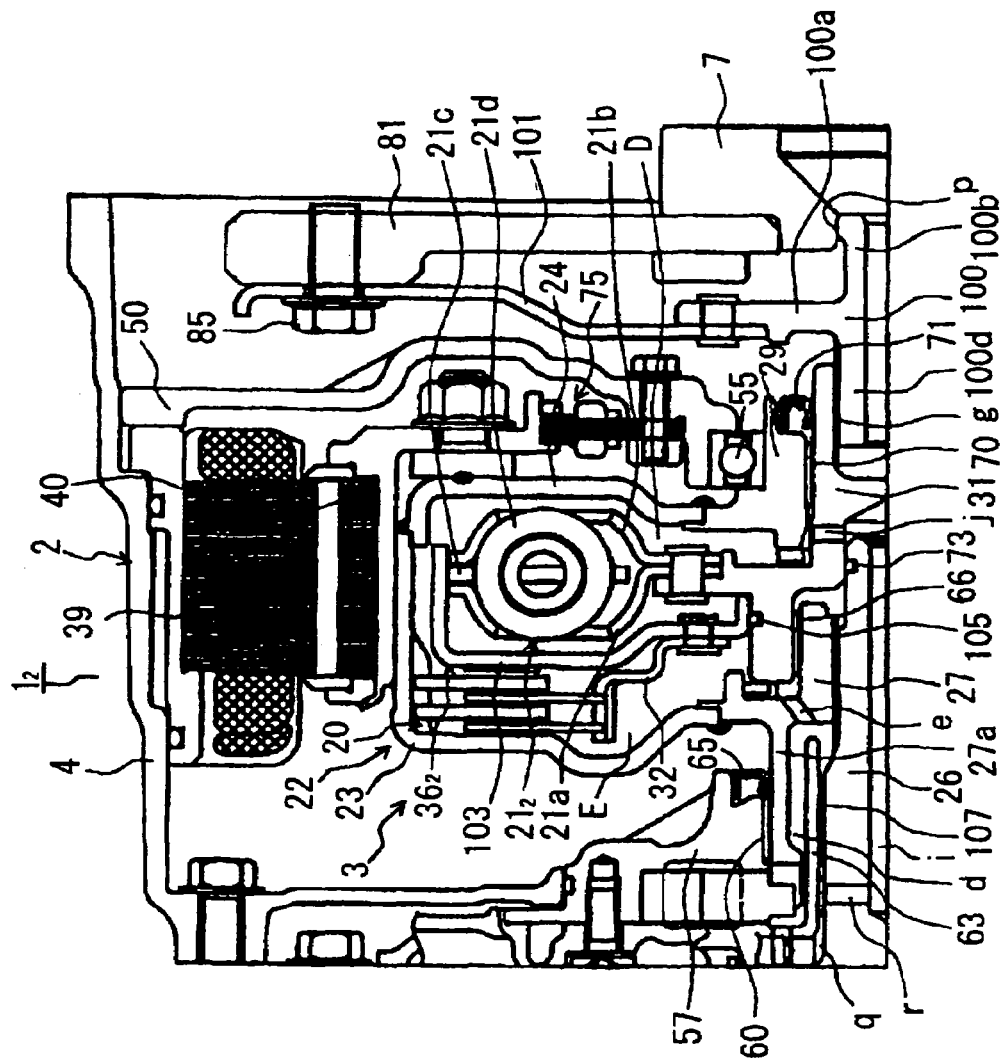
FIG. 4 is an enlarged cross-sectional view illustrating a portion of a driving apparatus for the hybrid vehicle according to another embodiment.

Next, a further changed embodiment will be explained with reference to FIG. 4. The present embodiment is different from the previous embodiment in a point that power is transmitted from the engine output shaft to the center member 31 which serves as a primary side member of the clutch 31 through an intermediate member. Further, an actuator of the clutch 20 in the present embodiment is different from that of the previous embodiment.

In a present driving apparatus $1_2$ for the hybrid vehicle, an intermediate member 100 is interposed between the engine output shaft 7 and the center member 31. The intermediate member 100 includes a cylindrical member having a flange 100*a* approximately at a center portion. A boss 100*b* includes a protruding portion p for aligning a shaft core fitted to the engine output shaft 7 (in row). A male spline is formed at an outer peripheral portion of a boss 100*d*. A flexible plate 101 is fixed to the flange 100*a*. An end portion of the flexible plate 101 is fixed to the drive plate (flywheel) 81, which is fixed to the engine output shaft 7, by the bolt 85.

The rear boss 100*d* of the intermediate member 100 engages with the female spline g of the center member 31. The center member 31 configures the primary side member of the clutch 20, and fixes two drive plates 21*a* and 21*b* of a damper spring 212. A driven plate 21*c* of the damper spring 212 is connected to a connecting plate 103 which serves as a piston member of an actuator 362 through a spline. A base portion of the connecting plate 103 is connected to the primary side hub 32 of the clutch 20. Further, the base portion of the connecting plate 103 is fitted to a boss portion of the center member 31 through a seal ring 105. The base portion of the connecting plate 103 is movable in an axial direction and is oil-tight by virtue of the seal ring 105.

Then, the connecting plate 103 which serves as the piston member configures the actuator $36_2$ like a lockup clutch of a torque converter which switches a state of in/out of operation of the clutch 20 on the basis of a flowing direction of the oil flowing in the cover 22 of a shell structure. A first oil passage includes an oil hole i formed in the input shaft 26 in an axial direction and an oil hole j formed in the center member 31 in a diameter direction, or the like. A second oil passage includes the oil passage d formed in the cylindrical portion 27*a* of the rear hub 27 and separated by the sleeve shaft 63, a bush 107, and the O-ring 73, and an oil hole e formed in the rear hub 27.

There are slight differences, for example, the bearings 66 and 70 for supporting the center member 31 are bushes in the present embodiment, which were needle bearings in the embodiment illustrated in FIG. 2, or the like. However, excepting those, the present embodiment is substantially as same as the previous embodiment. The rear hub 27 is supported at the pump body 57 by the bush 60, the front hub 29 is supported at the separation wall member 50 by the bearing 55, and the inside of the cover 22 is configured to be oil-tight by the oil seals 65 and 71.

On the basis of the configuration described above, power of the engine output shaft 7 is transmitted to the intermediate member 100 through the drive plate (flywheel) 81 and the flexible plate 101. Further, the power is transmitted to the center member 31 through the spline g. At this time, core fluctuation, for example, precession movement of the engine output shaft 7 caused by vibrations caused by combustion and expansion of the engine, or the like, can be absorbed by a presence of the flexible plate 101 and the intermediate member 100 through the protruding portion p for aligning the shaft core of the intermediate member, or the like. After that, the power is transmitted to the center member 31. By this, the center member 31 is supported at the cover member 22 in a condition of decreased influence caused by vibrations of the engine output shaft 7, and the cover 22 is supported at the separation wall member 50 by the bearing 55 in a condition where influence from the engine output shaft 7 is small. Accordingly, the cover 22 can be supported with a high precision because of the doubly supported configuration (55, 60). The rotor 40 of the motor 2 fixed to the cover can also be supported with high precision. Accordingly, the air gap between the stator 39 and the rotor 40 of the motor 2 can be controlled with high precision.

The torque transmitted to the center member 31 is transmitted to the connecting plate 103 through the damper spring 212, in other words, through the drive plates 21a and 21b, a coil spring 21d, and a driven spring 21c. Further, the torque is transmitted to the hub 32 at the primary side of the clutch 20.

Here, in a case where a switching valve (not illustrated) is set so as to supply the oil to a first chamber D separated by the connecting plate 103 in the cover 22 through oil passages q, r, i and j, and so as to discharge the oil from a second chamber E through the oil passages e and d, the connecting plate 103 which configures the piston member presses the clutch 20 by pressure difference between both chambers D and E in a direction that the clutch 20 is connected. Accordingly, in this state, the rotation of the hub 32 of the primary side is transmitted to the cover 22, which serves as the secondary side through the clutch 20. Further, the rotation is transmitted to the input shaft 26.

On the contrary, in a case where oil pressure is supplied to the second chamber E in the cover through the oil passages d and e, and where oil pressure is discharged through the first chamber D through the oil passages j, i, r, and q, the connecting plate 103 retains the clutch 20 in a released state by a pressure difference between both chambers E and D.

Figure 5:
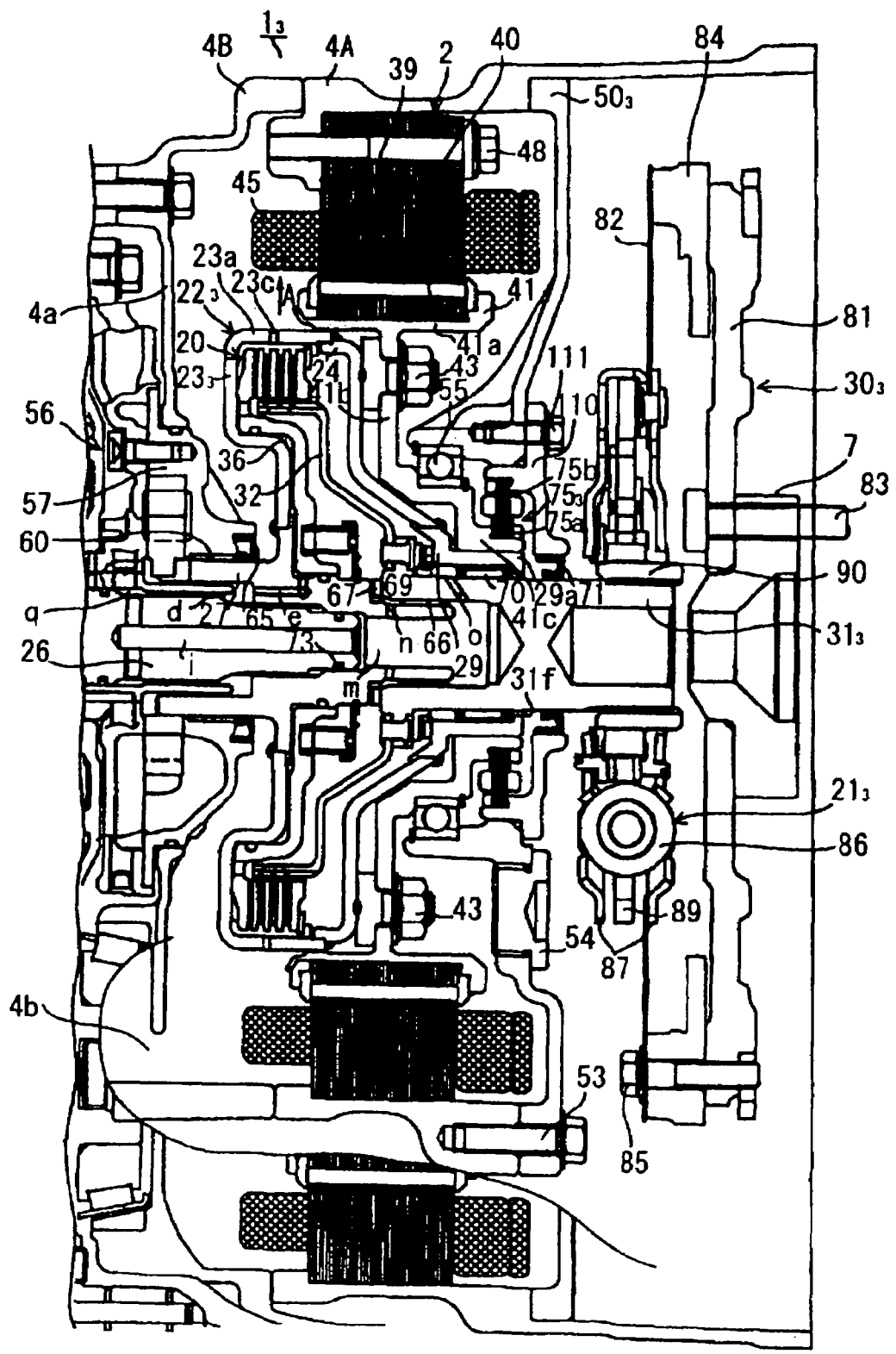
FIG. 5 is an enlarged cross-sectional view illustrating a portion of a driving apparatus for the hybrid vehicle according to still another embodiment.

Next, a further changed embodiment will be explained with reference to FIG. 5. The present embodiment is different from the previous embodiment (for example, the embodiment illustrated in FIG. 3) mainly in a point that a clearance between the front wall member of the motor housing (separation wall member $50_3$, sub separation wall member 110) and the center member $31_3$ is sealed by the oil seal 71, and that the inside of the motor housing 4, separated by the rear wall member and the front wall member, outside the cover $22_3$, is configured as a non-oil-bath-space at a degree that the inside of the motor housing 4 outside the cover $22_3$ is not immersed in oil (not oil-tight), and that a small amount of the lubrication oil is scattered (in other words, approximately dry space, a space to which the lubrication oil is slightly supplied). In the meantime, it is preferable that the approximately dry space, described here, is in a state where the amount of the oil is at a degree that the rotor of the motor 2 is not immersed in the oil.

In a present driving apparatus 13 for the hybrid vehicle, the motor housing 4 includes a front cylindrical portion 4A (hereinafter, referred to "front portion 4A of the motor housing) and a rear flange portion 4B (hereinafter, referred to "rear portion 4B of the motor housing). The front portion 4A of the motor housing and the rear portion 4B of the motor housing are secured together by a bolt (not illustrated), or the like. The separation wall member $50_3$ and the sub separation wall member 110 which serves as the front wall member are provided at an inner peripheral side of the front portion 4A of the motor housing. Thus, the motor housing 4 is configured.

The separation wall member $50_3$ is fitted in the inner peripheral side of the front portion 4A of the motor housing, and fixed by the bolt 53. A cap member 54, which can be freely attached/detached, is fitted to the separation wall member $50_3$ at a portion positioned at the inner peripheral side from the rotor 40. When the cap member 54 is removed, engagement of the nut 43 (tightening and loosening) can be adjusted. Further, the ring-shaped sub separation wall member 110 is secured at an inner peripheral portion of the separation wall member $50_3$ by a bolt 111 so that the sub separation wall member 110 can be freely attached/detached from the outside of the motor housing 4, in other words, from the connecting member $30_3$ side (engine side). Then, the oil seal 71 is interposed between an inner peripheral surface of a center hole of the sub separation wall member 110 and an outer peripheral surface (outer peripheral portion) 31f of the center member $31_3$.

Figure 3:
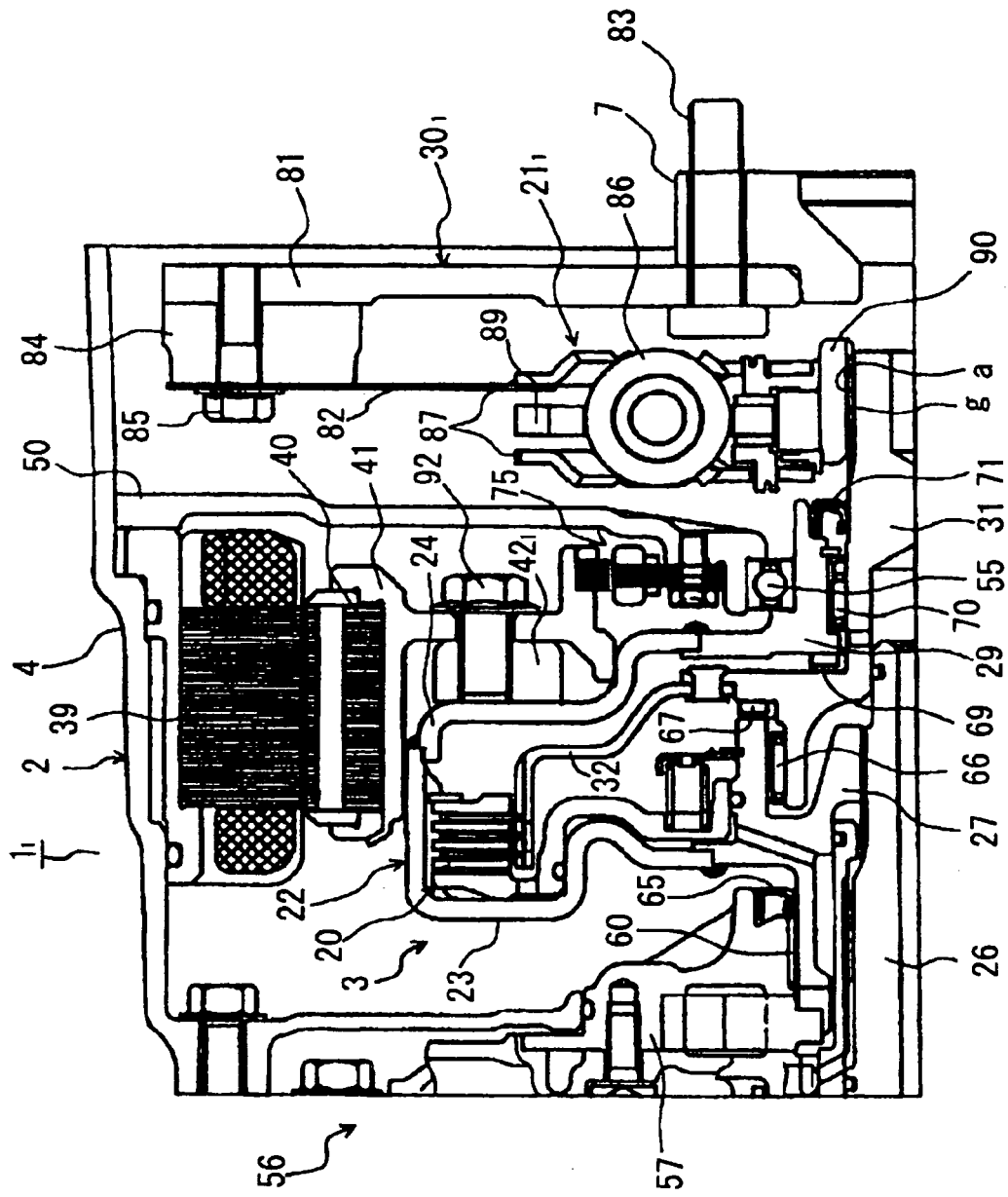
FIG. 3 is an enlarged cross-sectional view illustrating a portion of a partially changed driving apparatus for the hybrid vehicle.

In the meantime, a configuration of the connecting member $30_3$ is approximately the same as that in the previous embodiment (illustrated in FIG. 3). Accordingly, the same reference numbers will be applied thereto, and the explanations thereof will be skipped. Because the boss portion 90 engages with the center member $31_3$ through a spline, the connecting member $30_3$ can be slid toward the engine side and easily removed. Accordingly, attaching/detaching (positional alignment) the sub separation wall member 110 with use of the bolt 111 can be easy. Further, removing the cap member 54 and adjusting the nut 43 can also be easy.

On the other hand, the motor 2 is located in the motor housing 4 separated by the front wall member and the rear wall member, in other words, in the motor housing 4 separated by the separating wall member $50_3$, the pump body 57 of the pump assembly 56, and the rear wall 4a of the rear portion 4B of the motor housing. The stator 39 thereof is secured at a rear inner peripheral portion of the front portion 4A of the motor housing by a bolt 48. In the meantime, in the present embodiment, a water passage (air gap 51) is not formed at an outer peripheral side of the stator 39 (please refer to FIGS. 1 to 4). Further, the coil 45 of the stator 39 is not covered by a cover, or the like, and is in a bare state. Further, an outlet 4b, from which the lubrication oil is discharged, is formed at a downside of the rear wall 4a of the rear portion 4B of the motor housing.

In the supporting plate member 41 of the rotor 40 in the present embodiment, the plate portion 41b of the supporting plate is provided approximately center portion of an inner peripheral side of the supporting portion 41a of a cylindrical shape. The plate portion 41b of the supporting plate extends to cover the front cover 24 and the front hub 29. A cylindrical portion 41c, which fits to an outer peripheral portion of the cylindrical portion 29a of the front hub 29, is formed at the supporting plate member 41. Then, the ball bearing 55, which serves as the rotation-supporting member, is interposed between the center hole portion (inner diameter portion) of the separation wall member $50_3$ and the cylindrical portion 41c. The front hub 29 is freely rotatably supported by the bearing 55 through the supporting plate member 41 of the rotor 40.

Further, the rotor plate 75a is fixed at an outer peripheral portion of the cylindrical portion 41c of the supporting plate member 41 through many outer teeth formed at the outer peripheral portion of the cylindrical portion 41c. The stator 75b including inner teeth is fixed at an inside of the sub separation wall member 110. The inner teeth and the outer teeth face each other. Thus, the resolver $75_3$, which serves as a sensor for detecting a rotational angle (phase) of the rotor 40, is configured. As described above, attaching/detaching the sub separation wall member 110 can be easy. Accordingly, installment, positional alignment (adjustment), or the like, of the resolver $75_3$ can also be easy. This enables detection of the rotational angle of the rotor with high precision.

Then, the cover $22_3$ in the present embodiment is supported by the doubly supported configuration in which the front hub 29 and the rear hub 27 are freely rotatably supported at the separation wall member $50_3$ and the pump body 57 by the bearing 55 and the bush 60. Further, the cover $22_3$ configures a cover for covering the clutch 20. A rear cover $23_3$, which configures the cover $22_3$ includes a scatter hole 23c, from which the lubrication oil is scattered, provided at the drum portion 23a thereof. The scatter hole 23c is provided at a position that overlaps with the coil 45 of the stator 39 in a diameter direction, in other words, the scatter hole 23c is provided so that the scattered lubrication oil can directly hit the coil 45. The amount of the lubrication oil, supplied into the cover $22_3$ from the oil passages q, i, and oil passages m, n, and o sealed by the O-ring 73, is larger than that of the lubrication oil scattered from the scatter hole 23c. In other words, a diameter of the scatter hole 23c is appropriately designed so that the inside of the cover $22_3$ can be oil-tight.

On the basis of the configuration described above, for example, when the motor 2 functions as a motor and the rotor 40 is driven to rotate, or, when the clutch 20 engages and the rotation of the engine is transmitted through the clutch 20, the lubrication oil is supplied from the oil passages q, i, m, n, and o. Then, the cover $22_3$, of which the inside is oil-tight, rotates, and the lubrication oil is scattered from the scatter hole 23c toward a direction of an arrow A. The lubrication oil directly hits the coil 45, and cools the coil 45 (in other words, the stator 39). Further, a part of the lubrication oil supplied from the oil passage o passes through the bearing 70, the resolver $75_3$, and the bearing 55 while lubricating them. Then, the lubrication oil is supplied to the coil 45 of a counter side through the stator 39. Thus, the coil 45 (in other words, the stator 39) is cooled.

The lubrication oil supplied to the coil 45 is immediately discharged from the outlet 4b provided downside. Accordingly, the inside of the motor housing 4 is not immersed in the lubrication oil, in other words, the inside of the motor housing 4 is a non-oil-bath-space. Accordingly, loss caused by agitation of oil by the rotor 40 does not occur. Further, because the resolver $75_3$ is located in the non-oil-bath-space, loss caused by agitation by the resolver $75_3$ does not occur. Further, in particular, the bearing 55 is not located, for example, in the dry space as in the previous embodiment. The lubrication oil is supplied to the bearing 55. Accordingly, utilization of, for example, a bearing, in which grease or the like is sealed, is not necessary. Therefore, improvement of durability can be expected.

In the meantime, at the time of engagement of the clutch 20, pressure for the engagement is supplied to an oil chamber of the hydraulic actuator 36 from the oil passages d and e, which is different from the embodiment (for example, refer to FIG. 4) in which, for example, a pressure for the engagement is supplied into the cover $22_3$. Because the pressure for the engagement of the clutch 20 is not applied to the oil seal 71, improvement of sealing reliability can be expected.

In the embodiment explained above, except the explained part, there are slight differences in a shape of a configuration member and in positions where rotation-supporting members (bearing, bush) are located. However, excepting these, the embodiment is configured as same as the previous embodiment. Further, an operation is the same as in the previous embodiment excepting that the lubrication oil is supplied to the non-oil-bath-space in the motor housing 4, separated by the front wall member and the rear wall member, outside the cover $22_3$.

In the meantime, in the present embodiment, only the lubrication oil hits the coil 45 of the stator 39 for cooling. In other words, the present embodiment is configured as a so-called oil-cooler. However, as the previous embodiment, the water passage (air gap 51) can also be provided for enabling a so-called water-cooler. Further, the present embodiment can also be configured so that cooling by both oil and water is possible.

As described above, a driving apparatus for a hybrid vehicle according to the present invention is useful when installed in a vehicle such as a passenger car, a truck, and a bus. In particular, a driving apparatus for a hybrid vehicle according to the present invention is suitable when utilized for being installed in a vehicle in which control of a motor without interference from an engine and support of a rotor of the motor with high precision for improving efficiency of the motor are required.

According to an exemplary aspect of the present invention, the rotor of the motor is connected to the cover. The cover accommodates the friction plates of the clutch, or the like. The front hub and the rear hub, provided at a front portion and a rear portion thereof, are freely rotatably supported at the front wall member and the rear wall member of the motor housing. Accordingly, the cover is supported at the motor housing with a high precision because of a doubly supported configuration. Therefore, a precision of supporting the rotor integrally fixed to the cover is also high. In cooperation with the stator fixed to the motor housing, a gap (air cap) between the rotor and the stator can be controlled with high precision. Thus, efficiency of the motor can be improved, and the ability of the motor/generator can be improved.

According to another exemplary aspect, the inside of the cover is configured to be oil-tight so that the clutch, or the like, can be operated in lubricated circumstances. Accordingly, smooth operation and durability can be ensured. Further, the inside of the motor housing separated by the cover, the front wall member, and the rear wall member is configured to be the non-oil-bath-space, and the motor is located in the non-oil-bath-space. Accordingly, the rotor does not agitate oil, therefore loss caused by the agitation of the oil can be eliminated.

According to another exemplary aspect, the inside of the motor housing outside the cover is configured to be the dry space, and the motor is located in the dry space. Accordingly, the rotor does not agitate oil, therefore loss caused by the agitation of the oil can be eliminated.

According to another exemplary aspect, a rotational angle-detecting sensor is fixed at the supporting member of the rotor and the front wall member of the motor housing. Accordingly, for example, if a hole is provided at the front wall member, the sensor such as the resolver, or the like, can easily be adjusted from a front of the driving apparatus. As a result, the rotational angle of the rotor can be detected with high precision.

Further, the sensor such as the resolver, or the like, can also be located in the dry space. Accordingly, loss caused by agitating the oil can be eliminated.

According to another exemplary aspect, because the rear wall member includes the oil pump assembly, a conventional automatic transmission can be utilized. By utilizing a converter housing thereof as the motor housing, and by providing the separation wall member that serves as the front wall member, parts and facilities for the automatic transmission can be common. Accordingly, the driving apparatus for the hybrid vehicle can be provided without requiring much investment in facilities, or the like.

According to another exemplary aspect, the outer peripheral surface of the cylindrical portion of the center member is utilized for supporting the rotation-supporting member and as the surface for interposing the oil seal, and the inner peripheral surface of the cylindrical portion is utilized as the inner spline connected to the engine output shaft side member. Accordingly, the configuration can be more compact in an axial direction by this, therefore installability in a vehicle can be improved.

According to another exemplary aspect, because the oil scattered from the scatter hole hits the stator, the oil can cool the motor (in particular, the stator). At the same time, because the motor is located in the non-oil-bath-space, the rotor does not agitate oil. Accordingly, loss caused by the agitation of the oil can be eliminated. Further, the oil can lubricate members located in the non-oil-bath-space. Further, because the oil seal seals only the non-oil-bath-space, for example, oil pressure for engaging the clutch, or the like, is not applied to the oil seal. Accordingly, improvement in reliability of the seal can be expected.

According to another exemplary aspect, because the rotational angle-detecting sensor is fixed at the rotor supporting member and the sub separation wall member secured to the front wall member in such a manner that the sub separation wall member is freely detachable from the front wall member, the sensor can easily be approached from a front of the driving apparatus. Further, adjustment of the sensor such as the resolver, or the like, can be easy, therefore the rotational angle of the rotor can be detected with high precision.

Further, the sensor such as the resolver, or the like, can be located in the non-oil-bath-space, therefore loss caused by agitation of oil by the sensor can be eliminated.

According to another exemplary aspect, because the rear wall member is the oil pump assembly, a conventional automatic transmission can be utilized. By utilizing a converter housing thereof as the motor housing, and by providing the separation wall member and the sub separation wall member, which serve as the front wall member, parts and facilities for the automatic transmission can be common. Accordingly, the driving apparatus for the hybrid vehicle can be provided without requiring much investment in facilities.

Further, the oil seal is interposed between the sub separation wall member, secured to the inner peripheral portion of the separation wall member from an outside, and the center member. In other words, the rotation-supporting member, located between the inner diameter portion of the separation wall member and the cylindrical portion of the front hub, is located in the non-oil-bath-space. Accordingly, a configuration in which lubrication oil is supplied to the rotation-supporting member becomes possible. Comparing with a case where, for example, lubrication oil is not supplied to the rotation-supporting member but grease, or the like, is utilized for the rotation-supporting member, durability can be improved.

According to another exemplary aspect, the damper spring is accommodated in the cover and the primary side of the clutch. At the same time, the clutch and the damper spring can be accommodated in the cover within a width of approximately the same degree as a width of the motor. Accordingly, the configuration can be more compact, in particular, the configuration can be more compact in an axial direction. Further, because the cover member accommodates the clutch and the damper spring aligned side-by-side, a wider length (width) in an axial direction is required by this. Therefore, a supporting precision of the doubly supported configuration can be improved.

What is claimed is:

1. A driving apparatus, comprising:
   a transmission mechanism portion;
   a motor housed in a motor housing located at an engine side of the transmission mechanism portion; and
   a clutch interposed between an engine output shaft and a rotor of the motor that is connected to an input shaft of the transmission mechanism portion, wherein:
   an output member of the clutch, which is connected to the input shaft, is configured by a cover;
   the cover houses friction plates of the clutch, an actuator, and an input member of the clutch connected to the engine output shaft;
   the rotor of the motor is integrally connected to the cover, which is the output member of the clutch;
   a stator of the motor is fixed to the motor housing;
   a front hub positioned at the engine side of the cover is rotatably supported at a front wall member of the motor housing; and
   a rear hub positioned at the transmission mechanism portion side of the cover is rotatably supported at a rear wall member of the motor housing.

2. The driving apparatus according to claim 1, wherein:
   an inside of the cover is configured to be oil-tight,
   an inside of the motor housing separated by the cover, the front wall member, and the rear wall member is configured to be a non-oil bath space that is not immersed in oil, and
   the motor, including the rotor and the stator, is located in the non-oil bath space.

3. The driving apparatus according to claim 2, wherein an oil seal is provided at each of the front hub and the rear hub, and the non-oil-bath space is configured to be a dry space.

4. The driving apparatus according to claim 3, wherein a sensor that detects a rotational angle of the rotor is fixed at the rotor and the front wall member of the motor housing.

5. The driving apparatus according to claim 3, wherein:
   the rear wall member of the motor housing is an oil pump assembly integrally located at a fixed portion between a transmission case of the transmission mechanism portion and the motor housing,
   a cylindrical portion of the rear hub is rotatably supported at a pump body of the oil pump assembly through a first rotation-supporting member and is configured to be oil-tight via the oil seal for the rear hub,
   the front wall member of the motor housing is a separation wall member integrally fixed to the motor housing,
   a cylindrical portion of the front hub is rotatably supported at an inner diameter portion of the separation wall member through a second rotation-supporting member,
   the input member of the clutch includes a center member, which is fitted to the input shaft and which has an inner solid portion, and
   a third rotation-supporting member and the oil seal for the front hub are interposed between a cylindrical portion of the center member and a cylindrical portion of the front hub.

6. The driving apparatus according to claim 5, wherein the cylindrical portion of the center member includes (1) a supporting surface for the third rotation-supporting member and a surface for interposing the oil seal at an outer peripheral surface, and (2) an inner spline connected to an engine output shaft side member at an inner peripheral surface.

7. The driving apparatus according to claim 2, wherein:
   an oil seal is provided at each of the front wall member and the rear wall member to configure the non-oil-bath space,
   a scatter hole is provided at the cover so that oil can be scattered, and
   the motor is located so that the oil scattered from the scatter hole can hit the stator.

8. The driving apparatus according to claim 7, wherein:
   the front wall member of the motor housing is configured with a separation wall member integrally fixed to the motor housing and a sub separation wall member secured to the separation wall member in such a manner that the sub separation wall member is detachable from an outside, and
   a sensor that detects a rotational angle of the rotor is fixed at the rotor and the sub separation wall member.

9. The driving apparatus according to claim 7, wherein:
the rear wall member of the motor housing is an oil pump assembly integrally located at a fixed portion between a transmission case of the transmission mechanism portion and the motor housing,
a cylindrical portion of the rear hub is rotatably supported at a pump body of the oil pump assembly through a first rotation-supporting member and is configured to be oil-tight via the oil seal for the rear hub,
the front wall member of the motor housing is configured with a separation wall member integrally fixed to the motor housing and a sub separation wall member secured to an inner peripheral portion of the separation wall member from an outside,
a cylindrical portion of the front hub is rotatably supported at an inner diameter portion of the separation wall member through the rotor and a second rotation-supporting member,
the input member of the clutch includes a center member, which is fitted to the input shaft and which has an inner solid portion,
a third rotation-supporting member is interposed between an outer peripheral portion of the center member and a cylindrical portion of the front hub, and
the oil seal is interposed between the outer peripheral portion of the center member and the sub separation wall member.

10. The driving apparatus according to claim 1, wherein the input member of the clutch includes a damper spring, and the damper spring is located in the cover.

11. The driving apparatus according to claim 1, wherein the input member of the clutch includes a damper spring, and the damper spring is located outside the cover.

12. A hybrid vehicle comprising the driving apparatus according to claim 1.

13. The driving apparatus according to claim 1, wherein:
the rear wall member of the motor housing is an oil pump assembly integrally located at a fixed portion between a transmission case of the transmission mechanism portion and the motor housing,
a cylindrical portion of the rear hub is rotatably supported at a pump body of the oil pump assembly through a first rotation-supporting member,
the front wall member of the motor housing is a separation wall member integrally fixed to the motor housing, and
a cylindrical portion of the front hub is rotatably supported at an inner diameter portion of the separation wall member through a second rotation-supporting member.

14. The driving apparatus according to claim 1, wherein:
the rear wall member of the motor housing is an oil pump assembly integrally located at a fixed portion between a transmission case of the transmission mechanism portion and the motor housing,
a cylindrical portion of the rear hub is rotatably supported at a pump body of the oil pump assembly through a first rotation-supporting member,
the front wall member of the motor housing is configured with a separation wall member integrally fixed to the motor housing and a sub separation wall member secured to an inner peripheral portion of the separation wall member from an outside,
a cylindrical portion of the front hub is rotatably supported at an inner diameter portion of the separation wall member through a rotor of the motor and a second rotation-supporting member.

15. The driving apparatus according to claim 1, wherein an intermediate member is interposed between the engine output shaft and the input member of the clutch.

* * * * *